2,553,687

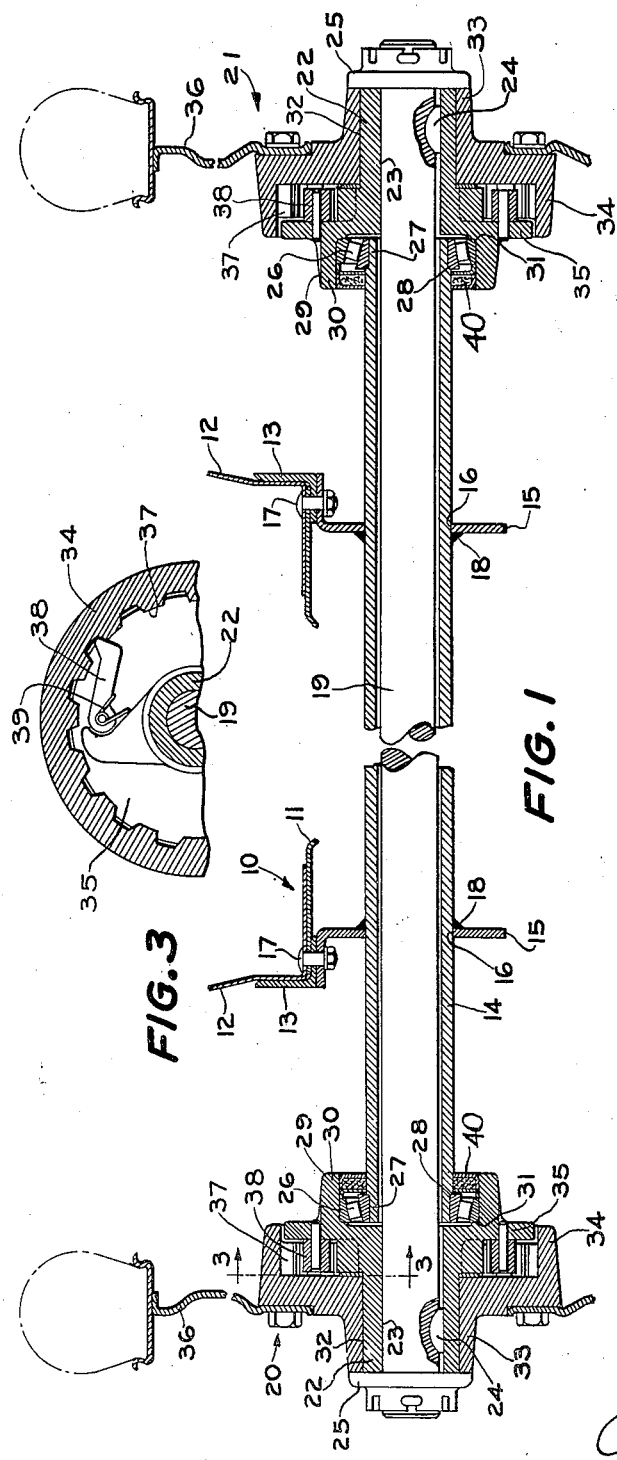
May 22, 1951     H. M. STUELAND     2,553,687
VEHICLE BODY AND AXLE CONSTRUCTION
Filed May 19, 1948
INVENTOR.
H. M. STUELAND
ATTORNEYS Patented May 22, 1951

UNITED STATES PATENT OFFICE 2,553,687

VEHICLE BODY AND AXLE CONSTRUCTION

Harold M. Stueland, East Moline, Ill., assignor to Deere & Company, Moline, Ill., a corporation of Illinois Application May 19, 1948, Serial No. 27,964

2 Claims. (Cl. 74—13)

1

This invention relates to a vehicle body and axle construction and more particularly to an axle assembly and the structure by means of which it is associated with a vehicle of the wagon or trailer type such as exemplified by a manure spreader.

The conventional spreader includes a longitudinal body carried at its rear end on a pair of laterally spaced wheels and carried at its forward end on a steerable truck or directly on a tractor or similar propelling vehicle. The spreader includes a number of moving parts which, in most cases, are driven from the rear ground wheels. These wheels therefore serve the dual function of supporting the spreader and furnishing power for driving the apron and beater and other related spreader parts.

The present invention contemplates and has for a principal object the provision of an improved axle assembly including a transverse housing in the form of a tubular member rigidly secured to the spreader body and through which extends a driving axle having opposite end portions to which the driving wheel assemblies are respectively secured. It is an object of the invention to utilize the transverse tubular housing as a structural part of the body and particularly as a torsion member for controlling torsional strains imposed upon the body during travel thereof over uneven ground. A further object of the invention relates to improved means for mounting the wheel assemblies. A still further object relates to the utilization of the axle as means for tying the wheel assemblies together with respect to the tubular housing, the parts being so arranged that axial or thrust loading on the wheels is taken mainly by the tubular housing. In this respect, it is a feature of the invention to provide bearing means for the wheels, each means including a combined radial-thrust bearing carried at an outer end portion of the tubular housing and supporting the proximate wheel assembly. Still further, the invention includes as a feature means on the axle for adjusting the bearings. Each wheel assembly is provided with an inner member which is secured to the axle for rotation therewith and an outer member which is journaled on the inner member, there being one-way torque-transmitting mechanism between the associated pair of wheel members so that the torque delivered by both wheels may be transmitted to the axle during straight-ahead operation of the spreader, the torque-transmitting means providing for overrunning of the wheels by the axle when the spreader is turning corners.

The foregoing and other important objects and desirable features of the invention will become apparent to those versed in the art as the disclosure is more fully made of a preferred embodiment of the invention in the following detailed description and accompanying sheet of drawings, in which:

Figure 1 is a transverse sectional view of the body and axle construction, an intermediate portion of the structure being omitted for the purpose of enlarging the scale of the drawings;

Figure 2 is a rear elevational view of the body and the tubular axle housing shown on a smaller scale and omitting the wheel assemblies and axle; and Figure 3 is a fragmentary sectional view taken substantially on the line 3—3 of Figure 1 and illustrating one of the torque-transmitting connections between the outer and inner wheel parts.

The spreader body is designated in Figures 1 and 2 by the reference numeral 10 and is shown as having a transverse bottom or floor 11 and opposite substantially vertical, longitudinally running side walls 12. The body structure further includes a pair of parallel longitudinally running side sills preferably in the form of angles 13.

An elongated hollow housing member in the form of a tube 14 is disposed transversely across the body 10 below the floor or bottom 11. The tube 14 constitutes a torsional member and is rigidly secured to the body 10 by means of a pair of transversely spaced apart supporting plates 15, each of which is apertured at 16 to receive the tube 14 and each of which is further rigidly secured at 17 to the body structure 10, the preferred construction illustrated involving the flanges of the members 15 and the securing thereof to the side sills 13 and floor 11. As indicated by the reference numeral 18, securing of the tube 14 to the members 15 is preferably accomplished by welding.

The relationship between the tube 14 and the body 10 as set forth above establishes the tube as a bracing member for reenforcing the body against undesirable torsional or twisting stresses. At the same time, the transverse disposition of the tube and the rigid mounting thereof at transversely spaced portions of the body eliminates the necessity for the use of additional bracing at this point in the body, thereby utilizing the torque tube as a structural member and also as means for accommodating the axle assembly to be described below.

A driving axle 19 extends axially through the tube 14 and had opposite end portions projecting axially respectively beyond opposite end portions of the tube. The axle 19 is loosely rotatable within the tube, but preferably has no bearing on the interior surface of the tube.

The axle construction includes a pair of wheel assemblies, the left hand assembly being designated generally by the numeral 20 and the right hand assembly by the numeral 21. Since these assemblies may be identical for all practical purposes, only one will be described, it being understood that the other will include similar parts.

The assembly 20 includes an inner wheel member or hub part 22 which is bored at 23 to receive the left hand end of the axle 19. The hub member 22 and associated end of the axle are provided with appropriate cooperating keyways for the purpose of receiving a driving key 24, by means of which the parts 19 and 22 are connected together for rotation. Likewise, the hub member or part 22 of the right hand assembly is keyed at 24 to the right hand end of the axle 19. The hub part 22 is confined against axial displacement outwardly from the axle 19 by means of a thrust washer and nut assembly 25. Axial thrust loading inwardly of the axis of the axle assembly is taken by a pair of bearings 26, one for the left hand assembly 20 and the other for the right hand assembly 21. Each bearing is preferably of the anti-friction type and is further a combined radial-thrust bearing. For the purpose of carrying the bearings, opposite end portions of the housing or tube 14 are reduced in diameter at 27. The inner race ring of the proximate bearing fits on the reduced portion 27. Inasmuch as the portion 27 is of reduced diameter with respect to the cross sectional dimension of the tube 14, there is provided for each reduced bearing portion an adjoining thrust shoulder 28 against which the inner radial face of the inner race ring of the proximate bearing abuts or thrusts.

The inner portion of the wheel or hub member 22 is formed as an inwardly facing cup-shaped portion 29 which has an annular flange 30 of a diameter substantially larger than that of the reduced bearing portion 27 on the tube 14. The annular flange 30 thus encircles the bearing surface or portion 27 and receives the outer race ring of the bearing 26. The cup-shaped portion further includes a radial thrust portion or shoulder 31 which abuts the outer radial face of the outer race ring of the bearing. The bearings 26 thus take axial thrust in both directions, axially inward thrusts on the left hand wheel assembly 22 being taken directly by the left hand bearing 26 and axially outwardly directed thrusts on the left hand wheel being taken on the right bearings 26 through the intermediary of the axle 19 and thrust means 25. The thrust means 25 and associated bearing 26 thus provide a pair of spaced apart thrust means between which the wheel or hub part 22 is confined. Adjustment of the bearing 26 may be accomplished by tightening or loosening the thrust means 25.

The hub part 22 is provided with an external cylindrical bearing surface 32 on which is journaled an outer hub or wheel part 33. This part is in the form of an inwardly facing cup having an annular flange 34 which embraces or surrounds an enlarged portion 35 of the inner hub part 22. The wheel part 33 carries, in the usual manner, a wheel 36.

Radial loading between the spreader body and the wheels 36 is taken largely by the bearing 26; although, the axle 19 is subjected to some bending stresses because of the location of the wheel plane axially outwardly of the proximate bearing. As previously stated, thrust loading on the wheels is taken by the bearings 26. The preferred construction illustrated enables the use of the single pair of bearings 26 and frees the axle 19 to a large extent for the purpose of delivering torque from the spreader wheels 36 to operating parts of the spreader. As will be well understood by those versed in the art, the inner hub or wheel part 22 may be connected to such operating parts, the left hand member 22 being connected, for example, to means for driving the spreader apron and the right hand member 22 being connected to means for driving the spreader. The driving means as such have been omitted in the interest of clarity, since they form no part of the present invention.

A representative type of means for transmitting driving torque between the wheels 36 and the axle 19 is shown in Figure 3. The inner periphery of the flange 34 of the wheel part 33 is provided with a plurality of circumferentially spaced teeth 37 which cooperate with a driving lug or dog 38 pivoted on the enlarged portion 35 of the inner wheel or hub part 22. The lug or dog is spring loaded, as by a torsion spring 39, radially outwardly so that it will engage the driving teeth 37 as the wheels 36 rotate forwardly. It will be seen, of course, that the wheels will be rotated rearwardly without driving the axle 19; similarly, it will be seen that the axle 19 can overrun the wheels.

Another feature of the invention resides in the sealing of the bearings 26. This is accomplished by a pair of seals 40, one for each bearing. Each seal is between the outer surface of the tube 14 and the inner surface of the proximate flange 30, thus sealing the associated bearing from the outside. Inasmuch as the shaft 19 is enclosed within the tube 14 and the hub parts 22 are tightly fitted to the shaft, the bearings 26 are sealed by the hub parts. In short, dust cannot enter between the shaft 19 and tube 14 past the hub parts 22; hence, the bearings are sealed at the wheel sides thereof by the structure just described. As stated above, the sides of the bearings that face the body 10 are sealed at 40.

The disclosure herein relates to a preferred form of the invention and is based on a design that accomplishes the object of the invention as set forth above. Other objects and desirable features of the invention will undoubtedly occur to those skilled in the art, as likewise will numerous modifications and alterations in the preferred form of the invention illustrated and described. It is not intended to limit the invention to the precise details set forth.

I claim:

1. In a wagon or like vehicle having a body, a wheeled axle assembly comprising: a tube disposed transversely across the body and rigidly secured thereto against rotation and against axial displacement; means at each end portion of the tube providing an external cylindrical bearing surface substantially coaxial with the principal axis of the tube; a unitary axle extending through the tube and rotatable therein and having opposite end portions projecting respectively beyond opposite end portions of the tube and coaxial with the cylindrical bearing surfaces; a pair of wheel hub inner members secured respectively to opposite end portions of the axle and constrained for rotation therewith but axially shiftable in both directions with respect thereto, each member having a concentric, axially inwardly facing cup-shaped portion surrounding the proximate bearing surface to provide an annular recess about said surface; a pair of combination radial-thrust anti-friction bearings, one within each annular recess, for journaling the members respectively on the bearing surfaces of the tube; means on the tube respectively inwardly of the bearing surfaces and respectively abutted by the bearings to prevent axially inward displacement of the bearings with respect to the tube; adjustable securing means respectively at opposite ends of the axle and engaging the axle ends and the hub members for securing the members thrust-wise respectively against said bearings; a pair of wheel hub-outer members respectively journalled on said inner members and restrained axially by said securing means; and a pair of one-way torque transmitting connections, one between each inner member and its associated outer member.

2. In a wagon or like vehicle having a body, a wheeled axle assembly therefor, comprising: a tube disposed transversely across the body and rigidly secured thereto against both rotation and axial displacement, each of the opposite end portions of the tube being provided with a cylindrical bearing surface of reduced diameter as respects the cross-sectional dimension of the tube and thereby forming a thrust shoulder axially inwardly of the proximate end of the tube and adjoining the proximate bearing surface; a single radial-thrust bearing at each end of the tube, said bearings being respectively radially supported by the bearing surfaces and thrusting axially inwardly against the thrust shoulders; a unitary axle extending rotatably through the tube and having opposite, cylindrical end portions projecting respectively at opposite ends of the tube and concentric with the bearings and bearing surfaces; wheel hub members keyed respectively to opposite ends of the axle, each including an axial, cylindrical bore which receives the proximate cylindrical end portion of the shaft in radial-support relationship and an inwardly facing coaxial cup-shaped portion which is received and radially supported by the proximate bearing, each cup-shaped portion having a thrust shoulder bearing axially inwardly against the outer face of said bearing; and adjustable securing means engaging between each end portion of the axle and the proximate hub member and constraining the hub member against movement axially outwardly from its associated bearing.

HAROLD M. STUELAND.

REFERENCES CITED

The following references are of record in the file of this patent:

UNITED STATES PATENTS

| Number | Name | Date |
| --- | --- | --- |
| Re. 13,071 | Smith | Jan. 4, 1910 |
| 945,134 | Nash | Jan. 4, 1910 |
| 1,274,341 | Slaght | July 30, 1918 |
| 1,400,170 | Kraft | Dec. 13, 1921 |
| 1,503,849 | Proctor | Aug. 5, 1924 |
| 1,964,105 | Bowen | June 26, 1934 |
| 2,345,972 | Hardy | Apr. 4, 1944 |
| 2,498,173 | Monsel | Feb. 21, 1950 |